(12) United States Patent
Thomas

(10) Patent No.: US 7,380,803 B2
(45) Date of Patent: Jun. 3, 2008

(54) SHOPPING CART MODIFIED FOR VEHICLE TRANSPORT

(76) Inventor: James Paul Thomas, 12340 Wildlife Rd., Holt, FL (US) 32564

(*) Notice: Subject to any disclaimer, the term of this patent is extended or adjusted under 35 U.S.C. 154(b) by 265 days.

(21) Appl. No.: 11/164,754

(22) Filed: Dec. 5, 2005

(65) Prior Publication Data
US 2007/0126192 A1    Jun. 7, 2007

(51) Int. Cl.
*B62D 39/00* (2006.01)
(52) U.S. Cl. .................. 280/33.992; 224/519; 224/520; 224/521
(58) Field of Classification Search .............. 280/6.15, 280/6.151, 400, 401, 405.1, 406.1, 415.1, 280/416.3, 638, 35, 640, 656, 79.11, 769, 280/763.1, 764.1, 765.1, 766.1, 33.991, 33.992, 280/33.996, 33.997; 224/411, 519, 520, 224/521, 917.5
See application file for complete search history.

(56) References Cited

U.S. PATENT DOCUMENTS

| | | | | |
|---|---|---|---|---|
| 3,251,520 A * | 5/1966 | Van Dyke et al. | .......... | 224/510 |
| 4,199,170 A * | 4/1980 | Hubner et al. | .............. | 280/641 |
| 4,593,840 A * | 6/1986 | Chown | ........................ | 224/520 |
| 4,616,839 A * | 10/1986 | Trubiano | ............... | 280/33.991 |
| 4,744,590 A * | 5/1988 | Chesney | ..................... | 280/769 |
| 4,775,282 A * | 10/1988 | Van Vliet | .................... | 414/462 |
| 4,922,639 A * | 5/1990 | Rehrig | ......................... | 40/308 |
| 5,038,983 A * | 8/1991 | Tomososki | ................... | 224/521 |
| 5,215,234 A * | 6/1993 | Pasley | ........................ | 224/508 |
| 5,235,767 A * | 8/1993 | Waterman et al. | ............ | 40/308 |
| 5,280,932 A | 1/1994 | Folsom | | |
| 5,397,147 A * | 3/1995 | Ducharme et al. | ....... | 280/415.1 |
| 5,507,507 A * | 4/1996 | Davidson | ............... | 280/33.991 |
| 5,548,911 A * | 8/1996 | Myers | .......................... | 40/308 |
| 5,649,718 A * | 7/1997 | Groglio | ....................... | 280/641 |
| 5,794,953 A * | 8/1998 | Duchene et al. | ....... | 280/33.992 |
| 5,899,285 A | 5/1999 | Curbelo | | |
| 5,906,383 A | 5/1999 | Cortes | | |
| 6,039,227 A * | 3/2000 | Stark | ........................... | 224/521 |
| 6,099,035 A * | 8/2000 | Garvin, III | ................... | 280/769 |
| 6,164,896 A * | 12/2000 | Cummins | ................... | 414/462 |
| 6,168,058 B1 * | 1/2001 | Janek | .......................... | 224/527 |
| 6,502,730 B2 * | 1/2003 | Johnson | ...................... | 224/519 |
| 6,554,171 B1 * | 4/2003 | Ewing, III | ................... | 224/521 |
| 6,612,615 B1 * | 9/2003 | Dimand | ...................... | 280/769 |
| 6,641,147 B2 | 11/2003 | Werner | | |
| 6,698,995 B1 * | 3/2004 | Bik et al. | .................... | 414/462 |
| 6,802,441 B1 * | 10/2004 | DuRant et al. | ............. | 224/513 |
| 6,846,017 B2 * | 1/2005 | Martin | ....................... | 280/769 |
| 6,935,656 B2 * | 8/2005 | Stout | .......................... | 280/769 |

(Continued)

*Primary Examiner*—Christopher P. Ellis
*Assistant Examiner*—Vaughn T Coolman

(57) ABSTRACT

A shopping cart modified for vehicle transport and advertising method provides shoppers with a personal shopping cart they keep and use to transport groceries from the store to their home without unloading the groceries out of the cart multiple times, it includes a shopping cart modified with a locking support assembly comprising a rigid horizontally deposed inter support member with a connection plate member. The inter support member slides horizontally inside of a horizontal outer support member connected to a base plate that is connected to the lower side of a shopping cart basket whereby the shopping cart can be lifted and transported by locking the shopping cart onto a carrier means coupled to a receiver hitch of a vehicle. The advertising method comprises the steps of providing at least one removably attached advertising placard on a surface of the front wall, rear wall, and opposed side walls.

2 Claims, 4 Drawing Sheets

U.S. PATENT DOCUMENTS

| | | | |
|---|---|---|---|
| 7,004,480 B2* | 2/2006 | Trubiano | 280/33.992 |
| 7,090,104 B2* | 8/2006 | Dorety | 224/524 |
| 7,101,142 B2* | 9/2006 | Bik et al. | 414/462 |
| 7,249,771 B1* | 7/2007 | Brennan et al. | 280/35 |
| 2003/0057243 A1* | 3/2003 | Himel, Jr. | 224/519 |
| 2004/0051290 A1* | 3/2004 | Morgan | 280/769 |
| 2004/0173654 A1* | 9/2004 | McAlister | 224/519 |
| 2004/0219003 A1* | 11/2004 | Bik et al. | 414/462 |
| 2005/0133556 A1* | 6/2005 | Bolin | 224/509 |
| 2005/0263555 A1* | 12/2005 | Hail et al. | 224/402 |
| 2006/0097482 A1* | 5/2006 | Cumbie | 280/491.3 |
| 2006/0118586 A1* | 6/2006 | Heravi | 224/519 |
| 2006/0145461 A1* | 7/2006 | Anderson | 280/769 |
| 2006/0228201 A1* | 10/2006 | Lenceski | 414/466 |

* cited by examiner

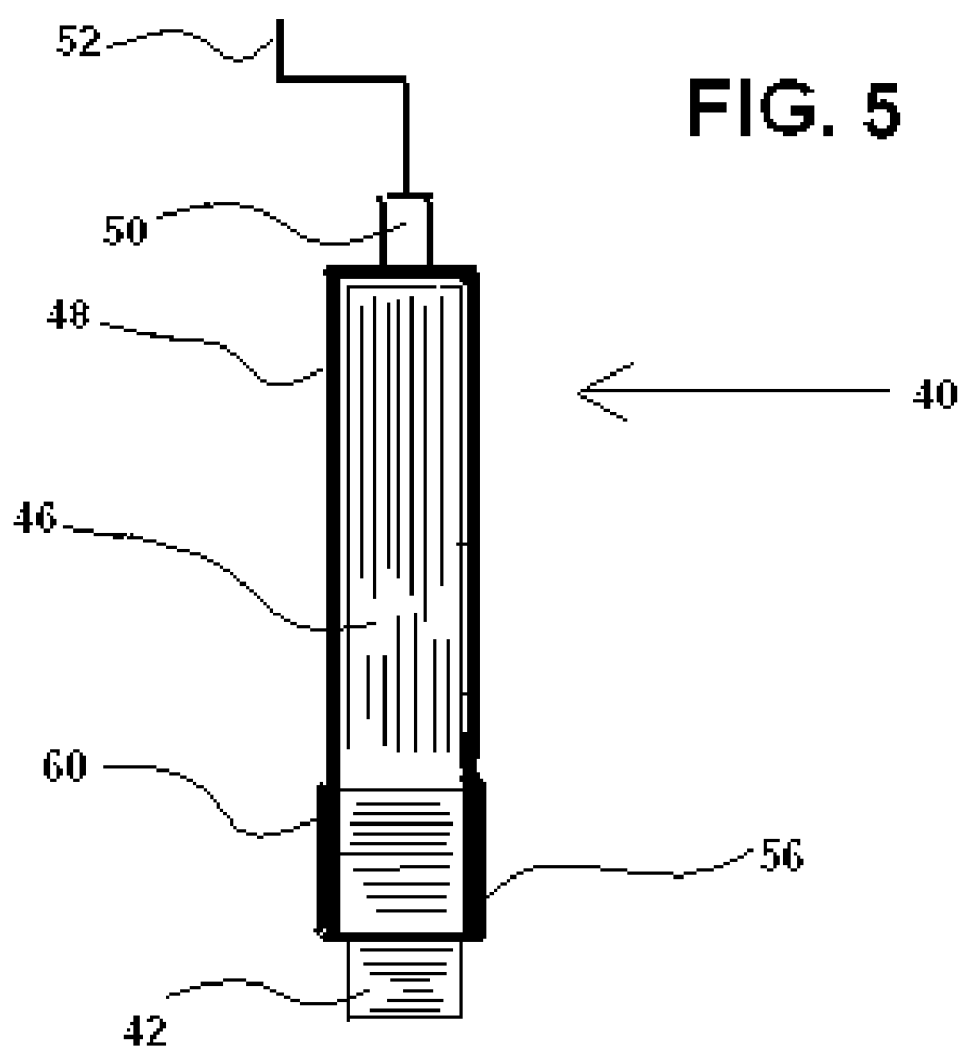

SHOPPING CART MODIFIED FOR VEHICLE TRANSPORT

BACKGROUND OF THE INVENTION

The present invention relates to shopping carts and more particularly to a shopping cart modified for vehicle transport and advertising method comprising a shopping cart modified to be lifted and carried behind a vehicle with advertising placards on the side walls, front wall and rear wall thereof whereby to carry promotional material which is visible to a user person and other shoppers and the advertising method wherein the promotional material generates additional income to a owner of the shopping cart by increasing sales and providing a payback of the shopping cart.

DESCRIPTION OF THE PRIOR ART

It is well known that shopping carts, of the kind typically found in supermarkets, department stores or other such stores are characterized by their use wherein the groceries, or other goods, are selected and placed in the shopping cart for transport to a check out station. The groceries are then unloaded onto a check-out counter. After scanning, or otherwise paying for the groceries, the groceries are again loaded back into the shopping cart. The shopping cart is moved to the vehicle wherein the groceries are once again unloaded and placed in the vehicle. After arriving at the final destination the groceries are removed from the vehicle and transported into the location of eventual use after sometimes making multiple trips back and forth to the vehicle. This requires the groceries to be handled multiple times which is inefficient and a burden especially to the elderly or those with infirmities.

These conventional type shopping carts have never been sold or marketed to individual shoppers because there was not a way to transport conventional shopping carts in the past by automotive vehicles. With a shopping cart modified for vehicle transport and advertising method, a shopper can use a personal conventional type shopping cart for their grocery shopping and in so doing can enjoy a much easier grocery shopping trip, eliminating multiple transfers of groceries that occur today with an average grocery shopping trip.

The shopping cart modified for vehicle transport and advertising method of this invention provides a ready means for the individual homeowner to easily accomplish the grocery shopping. The shopper is always assured of a shopping cart for use during his shopping venture. Moreover, the shopping cart modified for vehicle transport and advertising method offers a further advantage in that during inclement weather, the shopper is not bothered with transferring bags of groceries from a shopping cart to his automobile but can merely place the shopping cart on the carrier means with the groceries therein for transport to his residence. This is done simply and with little effort. At the destination end, the shopping cart is removed from the carrier and taken directly into the house or apartment for removal of the groceries in the kitchen or wherever else desired. The shopping cart can then be stored in a desirable area until it is needed once again for shopping.

Ownership by individuals of shopping carts in accordance with this invention is, moreover, extremely advantageous to the store owner now maintaining a rather large inventory of shopping carts. Costs of operations to the store owner will be somewhat reduced as the inventory of carts needed by the store or market can be reduced as time goes on. As the shopping carts are owned by the individual shoppers, these shopping carts will not become abandoned eyesores on city streets and sidewalks or in the parking lots of stores to become a nuisance to drivers.

The use of shopping carts is known in the prior art. More specifically, shopping carts of known designs and configurations previously devised and utilized for the purpose of holding and storing purchases through conventional methods and apparatuses are known to consist basically of familiar, expected, and obvious structural configurations, notwithstanding the myriad of designs encompassed by the crowded prior art which has been developed for the fulfillment of countless objectives and requirements.

By way of example,

U.S. Pat. No. 5,548,911 to Myers relates to an improved shopping cart with a pair of large plates affixed to one another with one plate on each side of the front wall of the shopping cart basket.

U.S. Pat. No. 5,794,953 to Duchene, et al. relates to an improved shopping cart with advertising card mount to plastic basket.

U.S. Pat. No. 5,235,767 to Waterman, et al. relates to a Shopping cart with a display unit that includes an enlarged platelike base member.

U.S. Pat. No. 6,641,147 to Werner relates to a modified shopping cart for holding large, long and bulky items, such as building materials and the like.

U.S. Pat. No. 5,280,932 to Folsom relates to a shopping cart with a waterproof advertising display device that includes a captive calculator.

U.S. Pat. No. 5,906,383 to Cortes relates to a combination shopping cart and basket includes a basket member with a pair of opposing gripping members to assist a user in lifting the device. The basket member is dimensioned to be received within a vehicle's trunk.

U.S. Pat. No. 5,899,285 to Curbelo relates to a Motorized personal shopping cart. Lastly, U.S. Pat. No. 4,199,170 to Hubner, et al. relates to a collapsible shopping cart supported for transport on the bumper of an automobile by brackets.

While these devices fulfill their respective, particular objectives and requirements, the aforementioned patents do not describe a shopping cart modified for vehicle transport and advertising method.

In this respect, the shopping cart modified for vehicle transport and advertising method according to the present invention substantially departs from the conventional concepts and designs of the prior art, and in doing so provides a new shopping cart modified for vehicle transport and advertising method which can be used for transporting groceries without unloading the contents of a shopping cart into an automotive vehicle. And can be used for displaying advertising placards on the side walls, front wall, and rear wall thereof whereby to carry promotional material which is visible to a user person and the other shoppers, and the advertising method wherein the promotional material generates additional income to a owner of the shopping cart by increasing sales and providing a payback of the shopping cart.

Therefore, it can be appreciated that there exists a continuing need for a new shopping cart modified for vehicle transport and advertising method which can be used for transporting groceries without unloading the contents of a shopping cart into an automotive vehicle. And can be used for displaying advertising placards on the side walls, front wall, and rear wall thereof whereby to carry promotional material which is visible to a user person and other shoppers, and the advertising method wherein the promotional material generates additional income to a owner of the shopping cart by increasing sales and providing a payback of the shopping cart. In this regard, the present invention substantially fulfills this need.

SUMMARY OF THE INVENTION

In view of the foregoing disadvantages inherent in the known types of shopping carts of known designs and configurations now present in the prior art, the present invention provides an improved shopping cart modified for vehicle transport and advertising method. As such, the general purpose of the present invention, which will be described subsequently in greater detail, is to provide a new and improved shopping cart modified for vehicle transport and advertising method which has all the advantages of the prior art and none of the disadvantages. To attain this, the present invention essentially comprises a shopping cart having a basket for the receipt of groceries, the basket being fabricated of wire, plastic resin, and having an essentially horizontal floor with a narrow front face and a wide rear face and tapering sides there between, with at least one removably attached advertising placard on a surface of at least one of said front wall, rear wall, and opposed side walls, the shopping cart also having wheels there beneath and a handle there above adjacent to the rear face, a sitting area in the basket, the sitting area being formed of a pivotable backrest with a top spaced a short distance from the rear face and having a generally horizontal seat between the backrest and the rear face, the sitting area being bounded on its side by the sides of the basket and further including apertures in the rear face above the seat for passage of legs of an infant sitting within the sitting area.

a rigid horizontally disposed generally rectangular base plate member with upper and lower portions is connected and affixed rigidly to the lower portion of a shopping cart basket, a rigid horizontally disposed generally tubular outer support member having frontal and posterior ends, said outer support member is connected and affixed rigidly to the lower portion of said base plate member, a rigid horizontally disposed generally tubular inter support member having frontal and posterior ends, said inter support member slides horizontally inside of said outer support member, a rigid vertically disposed generally rectangular retainer plate member is connected and affixed rigidly to the posterior end of said inter support member, a rigid vertically disposed generally rectangular connection plate member with upper and lower ends, is connected and affixed rigidly to the frontal end of said inter support member, a rigid generally circular support rod member is connected and affixed rigidly to the upper portion of said connection plate member and deposed transversely and;

a means for attachment of a shopping cart modified for vehicle transport to a vehicle receiver hitch comprising a rigid horizontally disposed generally tubular connection member having frontal and posterior ends, the frontal end is detachably secured to a vehicle receiver hitch, a rigid vertically disposed generally tubular inter support member having upper and lower ends, said lower end of inter support member is connected and affixed rigidly to the posterior end of the connection member, a rigid vertically disposed generally tubular outer support member having upper and lower ends, said lower end of the outer support member slides vertically over the upper end of the inter support member, an electric motor driven internal helically threaded shaft, or alternatively a hydraulic cylinder is affixed to the upper end of the outer support member, a rigid vertically disposed generally U shaped attachment member, is connected and affixed rigidly to the lower posterior portion of said outer support member, said attachment member has a puralilty of U shaped slots, said attachment member has a puralilty of pin aperture holes.

an advertising method with a shopping cart modified for vehicle transport, comprising the steps of: i) providing at least one removably attached advertising placard on a surface of at least one of said front wall, rear wall, and opposed side walls, an advertising placard with display material thereon for removable attachment to said front wall, rear wall, and opposed side walls, said display material containing an imagery and/or written material of promotional content to increase the sale of a promotional product which is displayed or described on said advertising placard and for a predetermined period of time, ii) changing said advertising placard after said predetermined period of time to provide a further advertising placard of a different promotional product during a further predetermined period of time.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shopping cart modified for vehicle transport and advertising method which has all of the advantages of the prior art shopping carts of known designs and configurations and none of the disadvantages.

It is another object of the present invention to provide a new and improved shopping cart modified for vehicle transport and advertising method which may be easily and efficiently manufactured and marketed.

It is further an object of the present invention to provide a new and improved shopping cart modified for vehicle transport and advertising method which is of durable and reliable constructions.

An even further object of the present invention is to provide a new and improved shopping cart modified for vehicle transport and advertising method which is susceptible of a low cost of manufacture with regard to both materials and labor, and which accordingly is then susceptible of low prices of sale to the consuming public, thereby making such a shopping cart modified for vehicle transport and advertising method economically available to the buying public.

Lastly, it is an object of the present invention is to provide a shopping cart modified for vehicle transport and advertising method which can be used for transporting groceries without unloading the contents of a shopping cart into an automotive vehicle. And can be used for displaying advertising placards on the side walls. front wall and rear wall thereof whereby to carry promotional material which is visible to a user person and other shoppers, and the advertising method wherein the promotional material generates additional income to a owner of the shopping cart by increasing sales and providing a payback of the shopping cart.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a schematic rear view of the carrier means of the present invention;

The same reference numerals refer to the same parts throughout the various Figures.

DESCRIPTION OF THE PREFERRED EMBODIMENT

The description below of a preferred embodiment of the subject invention will be a description of only one potential embodiment considered to be within the scope of the subject invention. Consequently, a description of such a preferred embodiment of the subject invention will not be considered as limiting the scope of the invention as set forth in the claims annexed hereto.

It is further to be stressed that in describing the preferred embodiment of the subject invention, the following described definitions, reference points, and reference axes will be utilized. Since the preferred embodiment of the subject invention includes a carrier device for connection to the rear of a vehicle, the word "frontal" will be used in reference to the front area of a vehicle, while the words "posterior" or "rear" will be used relative to direction disposed toward the rear of such a vehicle and generally extending towards a posterior direction from such vehicle. The words "longitudinal central axis" will refer to that axis which extends through the center, as seen in cross-section, of an object from the one end to the other end thereof over its longest extend; or alternately stated, from one extreme point to the most distal point on such object. The word "longitudinal" or "longitudinally extending" shall mean a direction extending more generally lengthwise in a given direction than otherwise. The word "transverse" or transversely will mean the lateral or width distance over a given object, which will be considered generally perpendicular to the longitudinal central axis of such object. The work "upper" will refer to distances extending above and away from the ground and the word "lower" will refer to those areas extending toward the ground reference. In this latter respect, the ground reference will be considered level or horizontal. Whenever the words "left" or "right" are used in the following description, they will be used, unless otherwise stated, in reference to any orientation of the left and right hand when one faces the carrier from a position posterior to the vehicle to which the carrier is connected.

Figure 1:
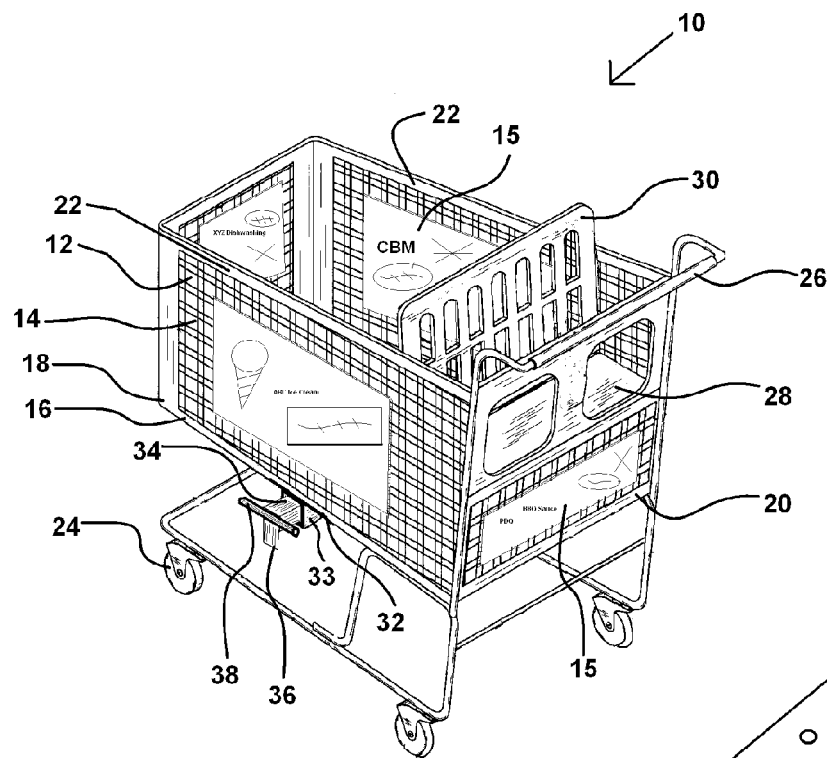
FIG. 1 is a perspective view of a shopping cart modified for vehicle transport and advertising method constructed in accordance with the principles of the present invention.
Figure 2:
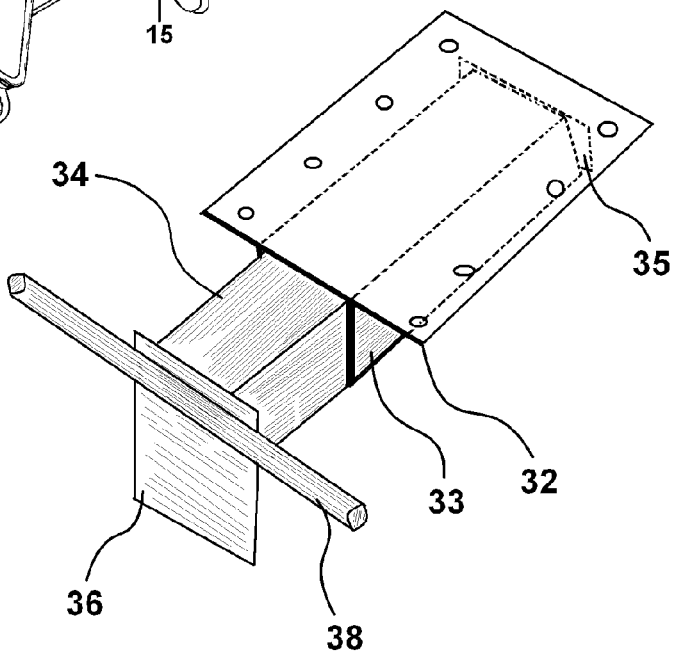
FIG. 2 is a perspective view of the connection member that attaches to the bottom basket of a shopping cart modified for vehicle transport and advertising method constructed in accordance with the principles of the present invention.
Figure 3:
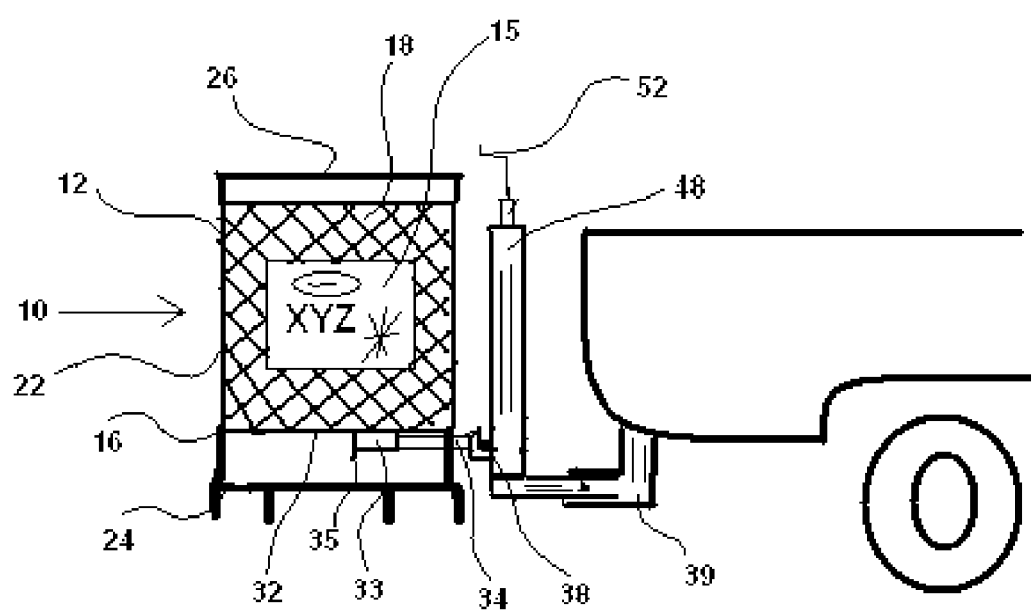
FIG. 3 is a side view of a shopping cart modified for vehicle transport and advertising method attached to the carrier coupled to a receiver hitch of a vehicle.
Figure 4:
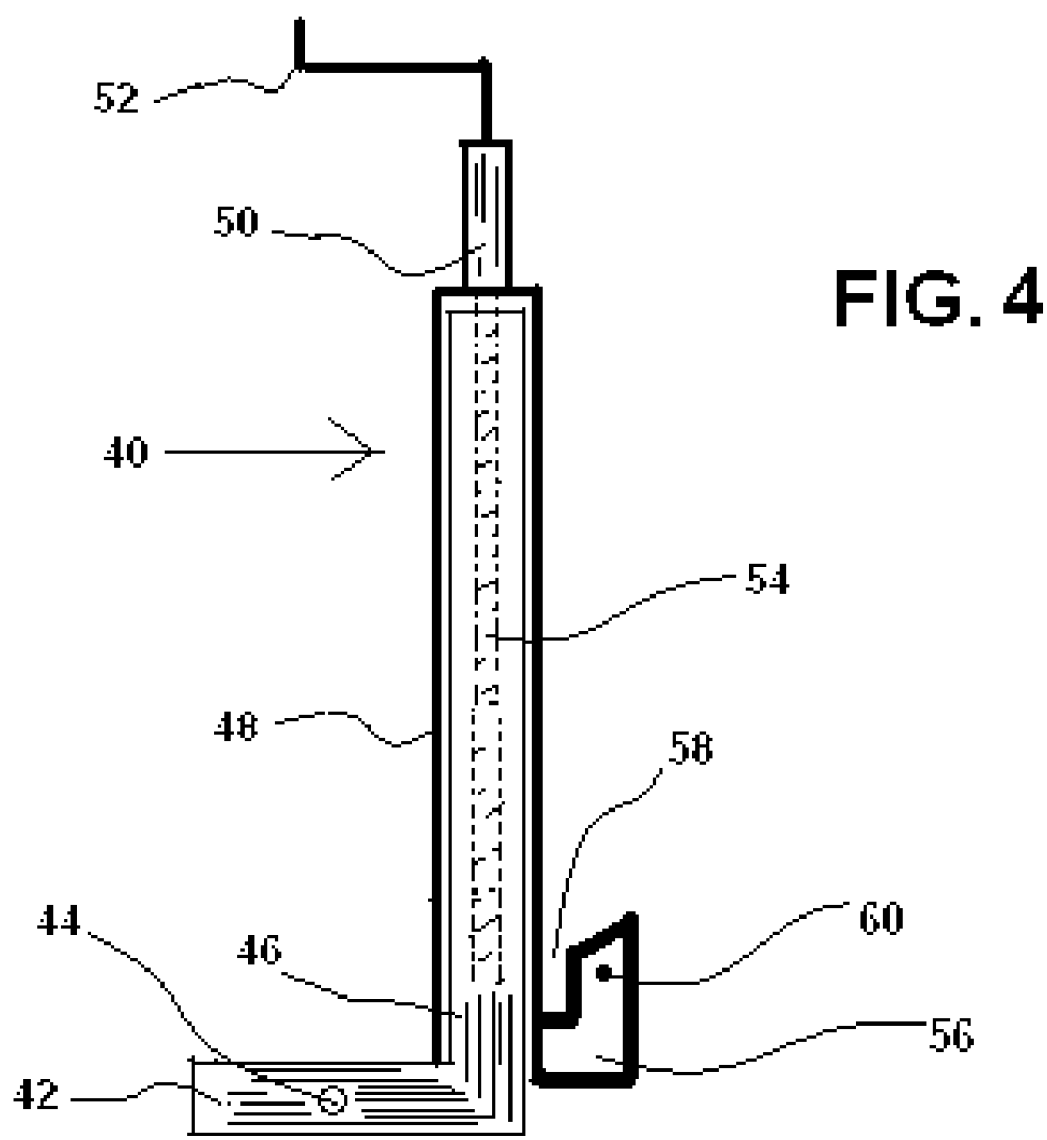
FIG. 4 is a schematic side view of the carrier means of the present invention.

With reference now to the drawings, and in particular to FIGS. 1 through 5 thereof, the preferred embodiment of the new and improved shopping cart modified for vehicle transport and advertising method embodying the principles and concepts of the present invention and generally designated by the reference numeral 10 will be described. The present invention, the shopping cart modified for vehicle transport and advertising method 10 is comprised of a plurality of components. Such components are individually configured and correlated with respect to each other so as to attain the desired objective. First provided is a shopping cart 12, the shopping cart has a basket 14 the basket is for the receipt of groceries, the basket is fabricated of wire or plastic resin, the basket has an essentially horizontal floor 16. The floor of the basket has a narrow front face 18. The floor of the basket has a wide rear face 20. The floor of the basket has tapering sides 22 between the front and rear faces. The shopping cart has at least one removably attached advertising placard on a surface of at least one of said front wall 18 and opposed side walls 22. The shopping cart has wheels 24. The wheels 24 are provided beneath the shopping cart. The shopping cart has a handle 26. The handle 26 is provided above the shopping cart 12 and adjacent to the rear face 20. A sitting area 28 is provided in the basket 14. The sitting area is formed of a pivotable backrest 30.

a rigid horizontally disposed generally rectangular base plate member 32 with upper and lower portions is connected and affixed rigidly to the lower portion of a shopping cart basket 14, a rigid horizontally disposed generally tubular outer support member 33 having frontal and posterior ends, said outer support member 33 is connected and affixed rigidly to the lower portion of said base plate member 32, a rigid horizontally disposed generally tubular inter support member 34 having frontal and posterior ends, said inter support member 34 slides horizontally inside of said outer support member 33, a rigid vertically disposed generally rectangular retainer plate member 35 is connected and affixed rigidly to the posterior end of said inter support member 33, a rigid vertically disposed generally rectangular connection plate member 36 with upper and lower ends, is connected and affixed rigidly to the frontal end of said inter support member 33, a rigid generally circular support rod member 38 is connected and affixed rigidly to the upper portion of said connection plate member 38 and deposed transversely.

A means for attachment of a shopping cart modified for vehicle transport, said carrier means 40 generally comprises a rigid horizontally deposed connection member 42 having frontal and posterior ends, The frontal end is detachably secured to a vehicle receiver hitch 39 using a pin aperture hole 44, a rigid vertically deposed inter support member 46 having upper and lower ends, said lower end is connected and affixed rigidly to said posterior end of the connection member 42, a rigid vertically deposed outer support member 48, having upper and lower ends, said lower end slides vertically over the upper end of the inter support member 46 The outer support member 48 is raised and lowered by means of an internal helically threaded shaft 54 connected to a screw jack assembly 50 that is connected to the upper end of the outer support member 48. The screw jack assembly 50 may be turned by an electric motor or a hand crank 52, alternatively a second embodiment could replace the internal helically threaded shaft with a hydraulic cylinder, a rigid vertically disposed generally U shaped attachment member 56, is connected and affixed rigidly to the lower posterior portion of said outer support member 33, said attachment member 56 has a puralilty of U shaped slots 58, said attachment member 56 has a puralilty of pin aperture holes 60.

The present invention provides an advertising method with a shopping cart modified for vehicle transport 10, comprising the steps of: i) providing at least one advertising placard 15 on a surface of at least one of said front wall 18 rear wall 20 and opposed side walls 22, an advertising placard 15 with display material thereon for removable attachment to said front wall 18, rear wall 20, and opposed side walls 22, said display material containing an imagery and/or written material of promotional content to increase the sale of a promotional product which is displayed or described on said advertising placard 15 and for a predetermined period of time, ii) changing said advertising placard 15 after said predetermined period of time to provide a further advertising placard 15 of a different promotional product during a further predetermined period of time.

As to the manner of usage and operation of the present invention, In use, the carrier means would be coupled to a vehicle's receiver hitch. The screw jack is in the lowest position. The shopping cart modified for vehicle transport is rolled adjacent to the carrier means. The connection plate member connected to the frontal end of the inter support member is pulled by hand outwardly from the lower side of the shopping cart until the support rod member is in close proximity to the outer support member of the carrier means. As the screw jack is turned, the attachment member connected to the lower frontal portion of the outer support member is raised. As the U shaped cutout slots on the attachment member come in contact with the support rod member, they lead the support rod member inside of the slot cut-out of the attachment member, a quick release pin is inserted in pin aperture holes on attachment member. As the screw jack continues higher the shopping cart is raised off the ground and held in place by the support rod member locked onto the attachment member. The user is now ready to transport the shopping cart to the store. Upon arrival at the store, the screw jack is lowered and the quick release pin is removed, the shopping cart detaches from the carrier. The connection plate member is pushed by hand back inside the outer support member until the connection plate member is under the bottom side of the basket of the shopping cart and out of view. The user rolls the shopping cart inside the store and used there own shopping cart for their purchases. After the user checks out of the store, they roll the loaded shopping cart adjacent to the carrier. The connection plate member connected to the frontal end of the inter support member is pulled by hand outwardly from the lower side of the shopping cart until the support rod member is in close proximity to the outer support member of the carrier means. As the screw jack is turned, the attachment member connected to the lower frontal portion of the outer support member is raised. As the U shaped cutout slots on the attachment member come in contact with the support rod member, they lead the support rod member inside of the slot cut-out of the attachment member, a quick release pin is inserted in pin aperture holes on the attachment member. As the screw jack continues higher the shopping cart is raised off the ground and held in place by the support rod member locked onto the attachment member. The user is now ready to transport the shopping cart back to their home. Upon arrival at users destination, the screw jack is lowered and the quick release pin is removed and the shopping cart detaches from the carrier. The connection plate member connected to the frontal end of the inter support member is pushed by hand back inside the outer support member until the connection plate member is under the bottom side of the basket of the shopping cart. The user rolls the shopping cart inside the house or as close to the final unloading area as possible. The shopping cart can then be stored in a desirable area until it is needed once again for shopping.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A shopping cart modified for vehicle transport comprising:
   a) a shopping cart having a basket for the receipt of groceries, the basket being fabricated of wire, plastic resin, and comprising an essentially horizontal floor with a narrow front face and a wide rear face and tapering sides therebetween, with at least one removably attached advertising placard on a surface of at least one of said front face, said rear face, and said tapering sides, the shopping cart also having wheels attached thereto and a handle adjacent to the rear face, a sitting area in the basket, the sitting area being formed of a pivotable backrest with a top spaced a short distance from the rear face and having a generally horizontal seat between the backrest and the rear face, the sitting area being bounded on its side by the sides of the basket and further including apertures in the rear face above the seat for passage of legs of an infant sitting within the sitting area;

b) a rigid horizontally disposed generally rectangular base plate member with upper and lower portions is connected and affixed rigidly to said floor of said shopping cart basket, a rigid horizontally disposed generally tubular outer support member having frontal and posterior ends, said horizonal outer support member is connected and affixed rigidly to the lower portion of said base plate member, a rigid horizontally disposed generally tubular inner support member having frontal and posterior ends, said horizontal inner support member slides horizontally inside of said horizontal outer support member, a rigid vertically disposed generally rectangular retainer plate member is connected and affixed rigidly to the posterior end of said horizontal inner support member, a rigid vertically disposed generally rectangular connection plate member with upper and lower ends, is connected and affixed rigidly to the frontal end of said horizontal inner support member, a rigid generally circular support rod member is connected and affixed rigidly to the upper end of said connection plate member and diposed transversely thereto and;

c) a means for attachment of said shopping cart modified for vehicle transport to a vehicle receiver hitch comprising a rigid horizontally disposed generally tubular connection member having frontal and posterior ends, the frontal end is detachably secured to said vehicle receiver hitch, a rigid vertically disposed generally tubular inner support member having upper and lower ends, said lower end of vertical inner support member is connected and affixed rigidly to the posterior end of the connection member, a rigid vertically disposed generally tubular outer support member having upper and lower ends, said lower end of the vertical outer support member slides vertically over the upper end of the vertical inner support member, an electric motor driven internal helically threaded shaft, or alternatively a hydraulic cylinder is affixed to the upper end of the vertical outer support member, a rigid vertically disposed generally U shaped attachment member is connected and affixed rigidly to a lower posterior portion of said vertical outer support member, said attachment member has a puralilty of U shaped slots and a puralilty of pin aperture holes.

2. The shopping cart of claim 1, wherein advertising indicia may be placed on all sides of said shopping cart basket and said means for attachment.

* * * * *